United States Patent
Porikli

(10) Patent No.: US 8,081,836 B2
(45) Date of Patent: Dec. 20, 2011

(54) METHOD FOR FILTERING OF IMAGES WITH BILATERAL FILTERS AND INTEGRAL HISTOGRAMS

(75) Inventor: Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 852 days.

(21) Appl. No.: 12/143,532

(22) Filed: Jun. 20, 2008

(65) Prior Publication Data

US 2009/0317014 A1    Dec. 24, 2009

(51) Int. Cl.
*G06K 9/40* (2006.01)
(52) U.S. Cl. .......................................... 382/261; 382/260
(58) Field of Classification Search .................... None
See application file for complete search history.

(56) References Cited

U.S. PATENT DOCUMENTS

2006/0177131 A1  8/2006  Porikli
2008/0298680 A1* 12/2008  Miller et al. .................. 382/168

OTHER PUBLICATIONS

Weiss, "Fast median and bilateral filtering," Proc. SIGGRAPH, pp. 519-526 2006.*

Porikli, "Integral histogram: A fast way to extract histograms in Cartesian spaces," Conference on Computer Vision and Pattern Recognition (CVPR), 2005.

* cited by examiner

*Primary Examiner* — Brian Werner
*Assistant Examiner* — Nirav G Patel
(74) *Attorney, Agent, or Firm* — Dirk Brinkman; Gene Vinokur

(57) ABSTRACT

The current invention describes a method for filtering an input image with a bilateral filter to produce an output image. The bilateral filter includes a spatial filter and a range filter. The method comprising the steps of: constructing an integral histogram from an input image including pixels, and wherein each pixel has an intensity; applying, for each pixel, the spatial filter to the integral histogram to produce a local histogram, each local histogram having a bin for a specified range of intensities of the pixels, each bin associated with a coefficient indicating a number of pixels in the specified range and an index to the coefficient; subtracting, for each bin in each local histogram, an intensity of the pixel from each index of the bin to produce a difference value; applying, for each bin, the range filter to each difference value to produce a response; scaling, each response by the corresponding coefficient to produce a scaled response; summing, for each local histogram, the scaled responses to produce a local response for the local histogram; summing, for each local histogram, the coefficients to produce a sum of the coefficient; and dividing, for each pixel, the local response by the sum of the coefficients to produce a response for the bilateral filter, which forms an output image.

6 Claims, 5 Drawing Sheets

METHOD FOR FILTERING OF IMAGES WITH BILATERAL FILTERS AND INTEGRAL HISTOGRAMS

FIELD OF THE INVENTION

The present intention relates generally to filtering images, and more particularly to filtering images with bilateral filters in constant O(1) time.

BACKGROUND OF THE INVENTION

A bilateral filter is a non-linear filter applied to an image in the spatial and intensity domain. A fast bilateral filter is important for many computer vision applications. Several methods are known for decomposing non-linear filters into separable one-dimensional filters, or cascaded representations to reduce processing time. This can be done by using of either an eigenvalue expansion of the 2D filter kernel, or application of a singular value decomposition (SVD. A number of methods aim to benefit from the parallel processing and reconfigurable hardware.

The bilateral filter is a non-iterative means for smoothing images while retaining edge detail. The filtering involves a weighted convolution, wherein the weight for each pixel depends not only on its distance from the center pixel, but also its intensity. A Bayesian approach is also in the core of the bilateral filter and described the bilateral filtering as a single iteration of a diagonal normalized steepest descent process.

A fundamental property of bilateral filters is the processing time per pixel, as a function of the (spatial) filter radius r. This corresponds to the performance of the method as the filter radius (or kernel size) varies. The performance is the primary differentiating characteristic among bilateral filtering methods.

Due to the joint spatial and range filtering, the bilateral filters are computationally demanding. For reference, a brute-force implementation can calculate each output pixel in exponential $O(r^2)$ time and becomes impractical for even moderate filter radii. The well known Photoshop© CS2's Surface Blur implementation, which is a bilateral filter, has a linear $O(r)$ time performance similar to a column-row histograms used by median filters.

The bilateral filter can be approximated by filtering sub-sampled copies of the image with discrete intensity kernels, and combining the filter responses using linear interpolation. In other words, that method treats the intensity image as a 3D surface, applies Gaussian smoothing to binary and intensity modulated surfaces, divides the intensities to determine the filtered intensity values at the original surface location. The method becomes faster as the radius increases due to the greater subsampling of the surface. The exact output depends on the phase of the subsampling grid. However, the discretization leads to loss of precision, particularly in high dynamic range (HDR) images.

One of the fastest prior art bilateral filter implementation converges to logarithmic O(log r) time, see Weiss, "Fast median and bilateral filtering," Proc. SIGGRAPH, pages 519-526 2006, incorporated herein by reference. That method uses a hierarchy of partial distributed histograms in a tier-based approach. Even though the complexity has been lowered, simplicity has been lost due to the relatively small filter size and histogram count specific implementation requirements. That method is limited to rectangular spatial kernels and box filters. Another concern is the imperfect frequency response of that spatial box filter.

SUMMARY OF THE INVENTION

The embodiments of the invention enable bilateral filtering in constant O(1) time without sampling. As defined herein, constant time means that the processing time of the filtering remains the same as the filter radius varies.

One embodiment of the invention takes advantage of integral histograms to avoid the redundant operations for bilateral filters with spatial and range kernels.

For bilateral filters constructed by polynomial spatial and range kernels, another embodiment provides a direct formulation by applying linear filters to image powers.

According to another embodiment, an arbitrary spatial filter and a Gaussian range and are expressed by a Taylor series as linear filter decompositions without any noticeable degradation of filter response All these embodiments drastically decrease the processing time to a constant time, e.g., to 0.3 seconds per 1 MB image, while achieving very high peak signal-to-noise ratio (PSNR) greater than 45 dB. In addition to the computational advantages, our methods are straightforward to implement.

It is believed that the present filtering method is the most efficient bilateral filter yet developed. This means that the method performs better than those of higher complexities as the kernel radius increases. Given the trend toward higher-resolution images, which correspondingly require larger kernel radii, filtering with large kernels as fast as with the small kernels makes the method advantageous.

An integral histogram is constructed from the input image, and the integral histogram is used to find the bilateral convolution response of a rectangular box filter with uniform domain kernel, where the intensity differences can be weighted with any arbitrary range function. The integral histogram enables construction of histograms of all possible kernels in a given image. The method takes advantage of the spatial positioning of pixels in a Cartesian coordinate system, and propagates an aggregated function, starting from an origin pixel, and traversing through the remaining pixels along scan-lines in a zig-zag order.

Histograms of image windows can be constricted by using the integral histogram values at the corner pixels of those windows without reconstructing a separate histogram for every single pixel.

For more generic Gaussian and polynomial range functions on arbitrary domain kernels, Taylor series expansion of the corresponding norms is used. This enables the use of "any" spatial kernel for bilateral filtering without increasing the complexity. Such bilateral filters can be expressed in terms of spatial linear filters applied to power images.

DETAILED DESCRIPTION OF THE PREFERRED EMBODIMENTS

Bilateral Filtering

A filter f is a mapping defined in a d-dimensional Cartesian space $\Re^d$. The filter assigns an m-dimensional response vector (response) $y(p)=[y_1, \ldots, y_m]$ to each pixel $p=[x_1, \ldots, x_d]$ of an input image I bounded within $N_1, \ldots, N_d$ and $0 \leq x_i < N_i$.

Generally, only a small set of pixels within a region of support S is used to determine the filter response. The region of support, which is centered around the pixel p, is called the filter footprint or kernel. Without loss of generality, the set of pixels maps to a scalar value, i.e., m=1 and $y(p)=y_1$. An example embodiment uses single channel image filtering (d=2, m=1). However, the method can be extended to higher dimensions, color images and temporal video filtering.

A 2D image filter centered at the image pixel p applies its coefficients f(k) to the values of the underlying image pixels k+p within its kernel $k=[k_x, k_y] \in S$.

For rectangular kernels, the coordinate of the center pixel can be assigned as the origin, i.e., S: $-r/2 \leq k_x, k_y \leq r/2$ where r is the radius of the filter. In case the values of the coefficients depend only on the spatial locations, the filter corresponds to a spatial filter.

If the filter is represented by a linear operator, e.g., as a matrix multiplication on its kernel, then the filter is linear. For instance, a 2D Gaussian smoothing operator is a linear filter in which the values of the coefficients change according to their spatial distances from the center pixel. Given the above notation, the response of the spatial filter can be expressed as $$y(p) = \kappa^{-1} \sum_{k \in S} f(k) I(p+k), \quad (1)$$

where $\kappa = \Sigma f(k)$ a scalar term to avoid bias. Note that, the above Equation is the same as the convolution of f and I. For simplicity, the filter is often normalized, i.e., $\Sigma f(k)=1$.

Figure 1:
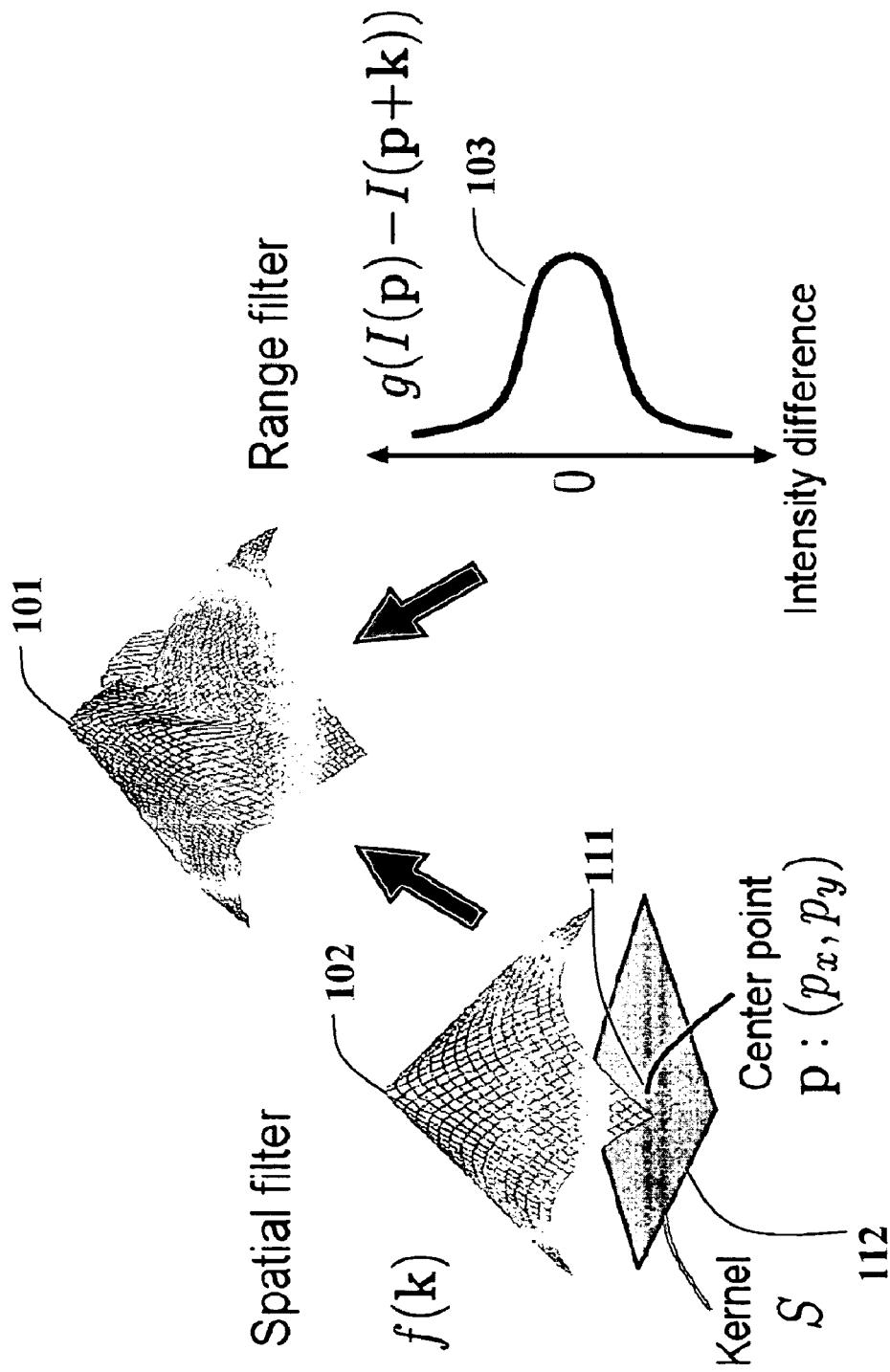
FIG. 1 is a schematic of a bilateral filter according to an embodiment of the invention.

As shown in FIG. 1, the bilateral filter 101 according to an embodiment of the invention combines a spatial filter 102 and a range filter 103. The vector coefficients of the spatial filer vary according to distances to the center pixel 111, and vector coefficients vector coefficients of the range filter g(p, k) vary according to intensity differences 103 between the center and remaining pixels in the kernel 112, instead of spatial distance to the center. The range filter is a function of the intensity difference, i.e., g(I(p)−I(p+k)).

In other words, a bilateral filter multiplies the intensity value of an image pixel in its kernel S by the corresponding spatial filter coefficient j(k), and a range filter coefficient g(p, k). Thus, the response of the bilateral filter is $$y_b(p) = \kappa_b^{-1} \sum_{k \in S} f(k) I(p+k) g(I(p) - I(p+k)), \quad (2)$$

where the normalizing term $$\kappa_b = \Sigma f(k) g(I(p) - I(p+k))$$

is a scalar function of the intensity differences. The range filter can have a different value at each pixel of the input image. Unlike the spatial filters, the normalizing term $\kappa_b$ is not constant.

Due to the above range filtering property, the bilateral filter is a non-linear filter. The response of the filter cannot be obtained by simple matrix multiplications. This is the main reason why conventional bilateral filters are computationally demanding.

It is an object of the invention, to perform bilateral filtering in constant O(1) time, independent of the radius (size) of the filter.

Bilateral Filtering with Spatial Filters

Equation (2) can be rewritten for the bilateral filter that has a fixed spatial filter f(k)=c (box filter), and an arbitrary range filter g(p, k), which can be called a type-I bilateral filter $$y_b(p) = c \kappa_b^{-1} \sum_{k \in S} I(p+k) g(I(p) - I(p+k)) \quad (3)$$

and $$\kappa_b = \sum g(I(p) - I(p+k)).$$

This response can be directly determined from the integral histogram h of the corresponding kernel as $$y_b(p) = c \kappa_b^{-1} \sum_i h_p(i) g(I(p) - i) \quad (4)$$

and $$\kappa_b^{-1} = \sum h_p(i), \quad (5)$$

where the range function is accumulated over the bin values of the histogram, instead of the direct intensity differences.

As described herein, this formulation is independent of the kernel radius r. As an advantage, all of the scalar terms can be processed in parallel and in constant time from the integral histogram. In addition, any arbitrary range filter g, including Gaussian filter functions and more complicated filter functions can be used.

Weiss, see above, gives the processing time for the type-I bilateral filter (spatial box, arbitrary range) as O(log r). The Weiss filter is approximately limited to radii r less than 128 for reasonable performance. The present method decreases this to a constant time O(1) for any radii r up to image size.

This constant time filter is believed to be the fastest known bilateral filter.

Bilateral with Arbitrary Spatial Filters

The formulation for the integral histogram cannot be applied to bilateral filters that have varying spatial filters. A polynomial range filter is $$g(p+k) = [1 - (I(p) - I(p+k))^2]^n, \quad (6)$$

where n is the order of the polynomial. For n=1, one can obtain the corresponding bilateral filter, which is called a type-II filter from Equation (2) as $$y_b(p) = \kappa_b^{-1}[\Sigma f(k) I(p+k) - I^2(p) \Sigma f(k) I(p+k) + 2I(p) \Sigma f(k) I^2(p+k) - \Sigma f(k) I^3(p+k)]. \quad (7)$$

A set of n images is denoted as $I^1 = I(p)$, $I^2 = I(p) I(p), \ldots, (I(p))^n$, and their corresponding filter responses are $$y_1 \Sigma f(k) I^1(p+k), y_2 \Sigma f(k) I^2(p+k), \ldots, y_n \Sigma f(k) I^n(p+k).$$

$$\Sigma f(k) I(p+k), y_2 = \Sigma f(k) I^2(p+k), \ldots,$$

Equation (7) can be rewritten as $$y_b = \kappa_b^{-1}[(1-I^2)y_1 + 2Iy_2 - y_3], \quad (8)$$

where the index p is omitted from the right-side of the Equation for simplicity.

Similarly, the normalizing term is $$\kappa_b = 1 - I^2 + 2Iy_1 - y_2.$$

Note that, the spatial filter f is not constrained, and any desired filter function can be selected.

Figure 4:
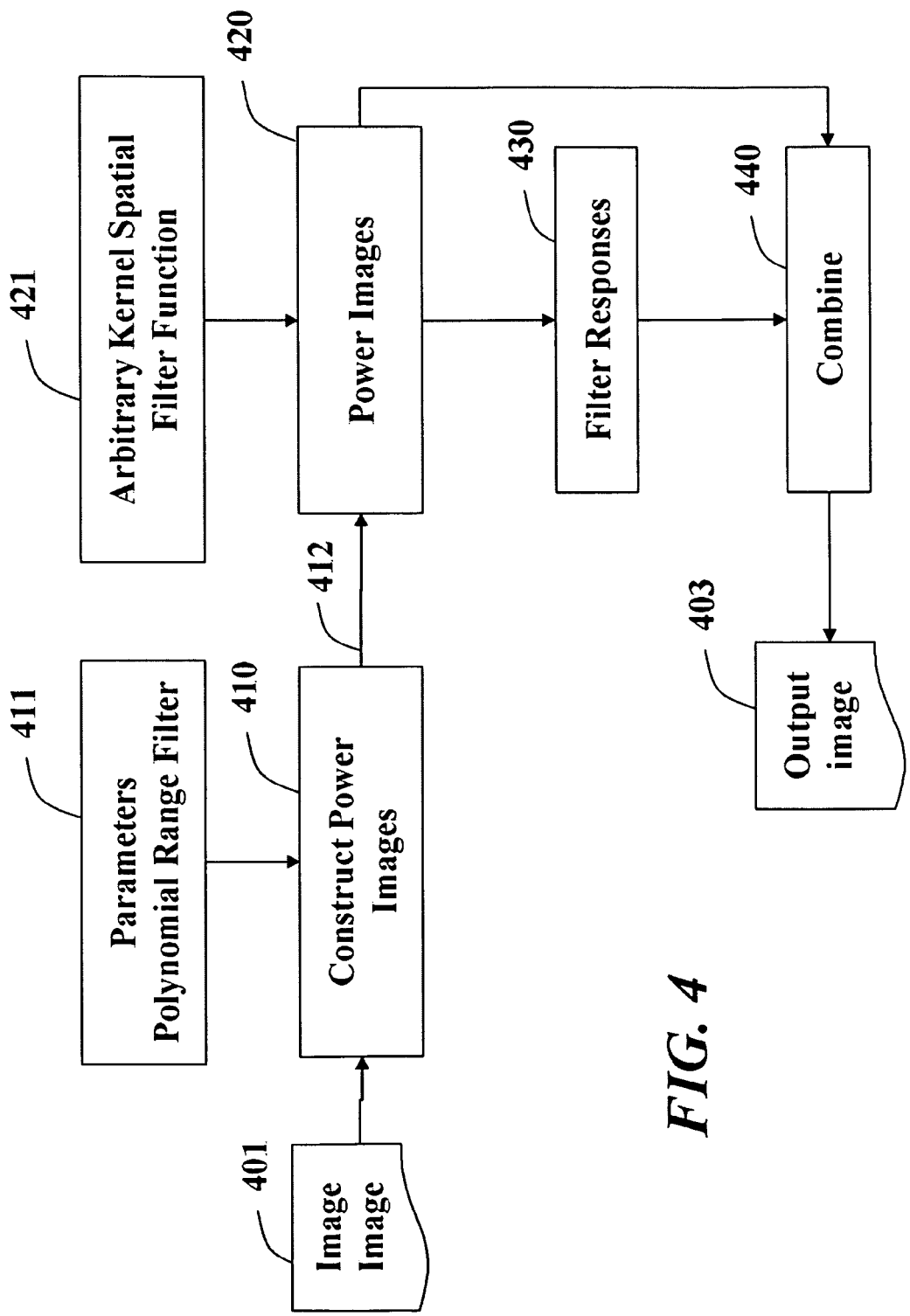
FIG. 4 is a flow diagram of a method for filtering an input image with a TYPE-II filter to produce an output image according to one embodiment of the invention.

For quadratic polynomial function (n=2) see FIG. 4, the response of the type-II bilateral filter of Equation (2) is $$y_b = \kappa_b^{-1}[(1-2I^2+I^4)y_1 + 4(I-I^3)y_2 + (6I^2-2)y_3 - 4Iy_4 + y_5], \quad (9)$$

where $$\kappa_b^{-1} = 1 - 2I^2 + I^4 + 4(I-I^3)y_1 + [6I^2-2]y_2 - 4Iy_3 + y_4.$$

Equations (8, 9) give the corresponding bilateral filter parameters with polynomial range filters in terms of the spatial filters without any approximations.

Figure 5:
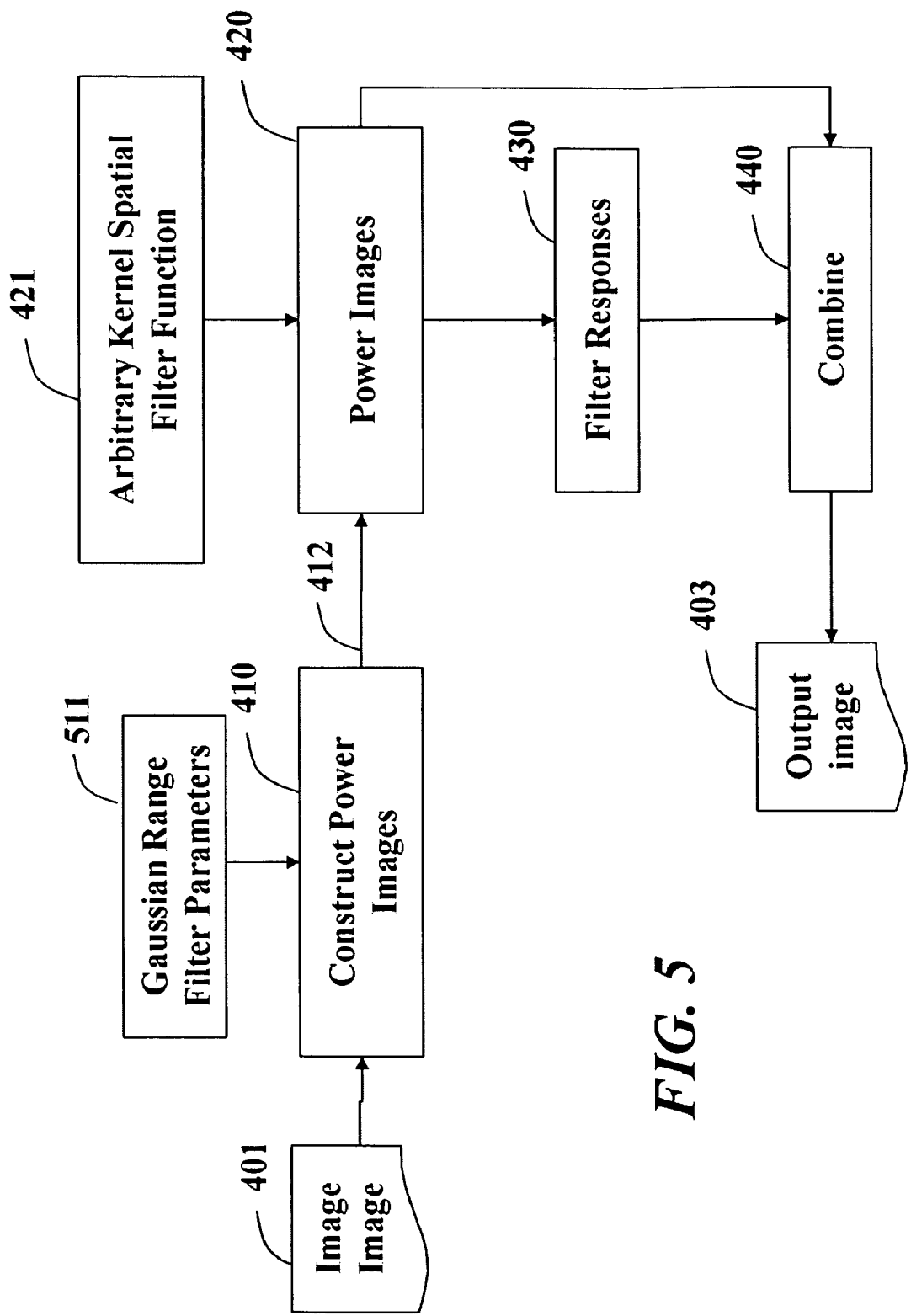
FIG. 5 is a flow diagram of a method for filtering an input image with a TYPE-III filter to produce an output image according to one embodiment of the invention.

Another common type of bilateral filters, type-III, use Gaussian range filter parameters 511 for additional smoothness, see FIG. 5. In this embodiment, Taylor series expansion of the Gaussian function approximates such bilateral filters. This method again does not have any restriction on the spatial filter f. Gaussian filters are differentiable and can be expressed in terms of linear transforms.

The Gaussian range filter is $$\exp(-\alpha[I(k+p)-I(p)]^2) \quad (10)$$

where $\alpha$ is a constant.

Equation (10) can be written as $$\exp(-\alpha I^2(p))\exp(-\alpha[I^2(p)-2I(p)I(p+k)]), \quad (11)$$

where the first term $$\exp(-\alpha I^2(p))$$

does not change within the kernel. This term also appears in the normalizing term, thus, it does not have to be determined separately.

By applying the Taylor expansion to Equation (11), one can obtain the bilateral filter expansion up to second order derivatives as $$y_b \approx \kappa_b^{-1}[y_1 + 2\alpha I y_2 + \alpha(2\alpha I^2 - 1)y_3 - 2\alpha^2 I y_4 + 0.5\alpha^2 y_5], \quad (12)$$

and, up to third order derivatives as $$y_b \approx \kappa_b^{-1}\left[\begin{array}{c} y_1 + 2\alpha I y_2 + (2\alpha^2 I^2 - \alpha)y_3 - 2\alpha^2\left(I - \frac{2}{3}\alpha I^3\right)y_4 + \\ \alpha^2(0.5 - 2I^2\alpha)y_5 + \alpha^3 I y_6 - (\alpha^3/6)y_7 \end{array}\right], \quad (13)$$

where the normalizing terms have similar forms containing the same terms.

Therefore, the bilateral filter can be interpreted as the weighted sum of the spatial filtered responses of the powers of the original image.

Constant O(1) Time Bilateral Filters

Figure 3:
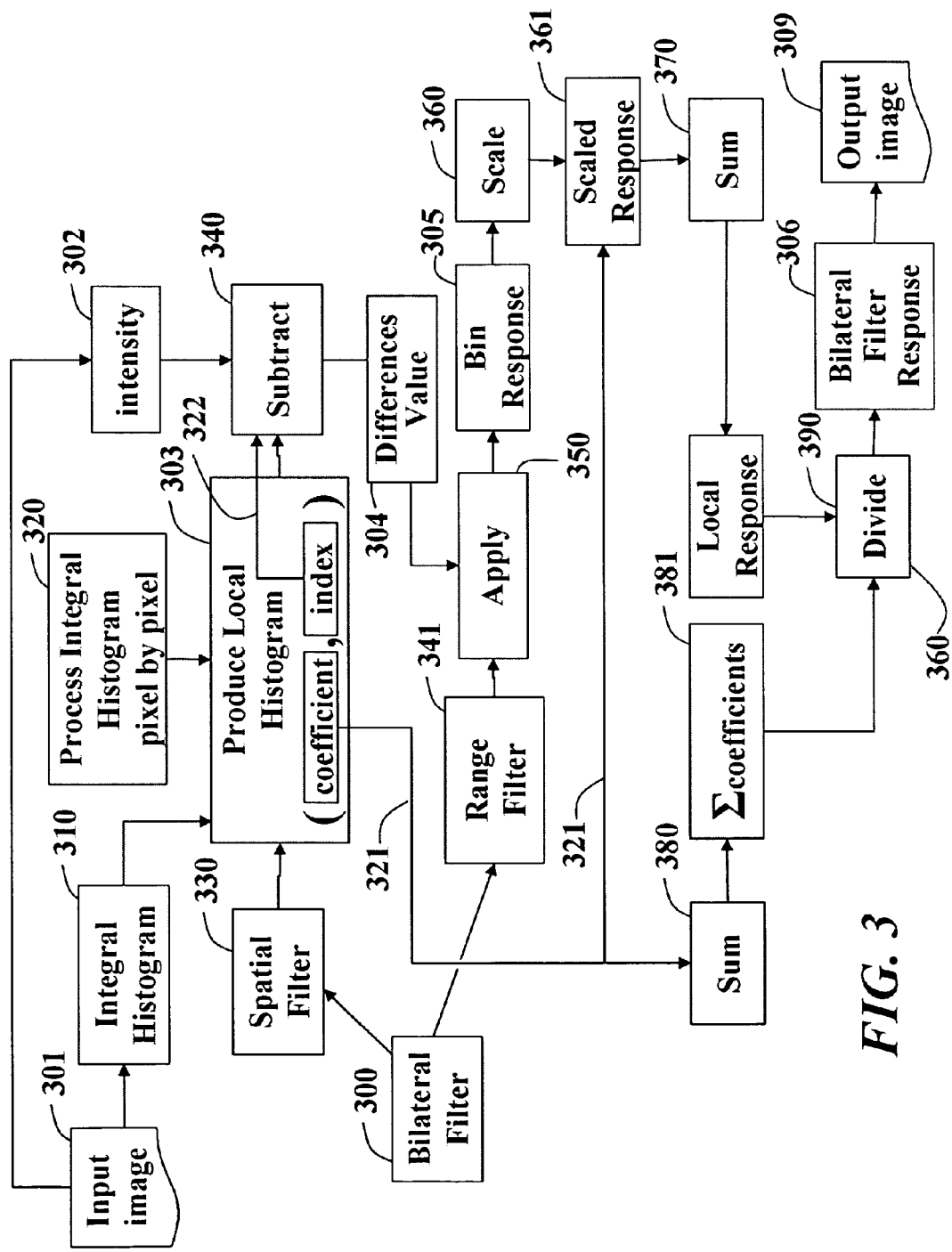
FIG. 3 is a flow diagram of a method for filtering an input image with a TYPE-I bilateral filter to produce an output image according to an embodiment of the invention.

There are various ways of determining the 2D spatial linear filter responses, see FIGS. 3-5. The spatial box filter 330, also known as a 'moving average', is a simple linear filter with a rectangular kernel where all kernel coefficients are equal. This filter can also be determined in constant O(1) time by using the integral histogram 310.

Integral Image

An integral image $l_\Sigma$ is the accumulated sum of pixel intensities in an input image. The sum of any image region $\Sigma I(p)$ is determined by three arithmetic operations involving the pixel intensity values of the integral image at corner pixels $p^{++}$, $p^{-+}$, $p^{+-}$, $p^{--}$ of an image region, e.g., $$\Sigma I(p) = l_\Sigma(p^{++}) - l_\Sigma(p^{+-}) - l_\Sigma(p^{-+}) + l_\Sigma(p^{--}).$$

Triangular filters, e.g., ramp, Bartlet filter or polynomial filters, can be constructed as a superposition of two box filters with the same radii. The computational complexity of the ramp filter is twice the complexity of the box filter. Thus, the ramp filter can also be applied in constant O(1) time, and the results are visually very similar to the Gaussian filter.

The response of the polynomial filters, $f(k) = 1 - k^n$, can also be determined in constant O(1) time using the set of integral images. The square distance norm is $$y_1(p) = \sum_{k \in S} f(k) I(p+k) = \sum_{z \in S^z} f(z-p) I(z)$$

$$= \sum_{z \in S^z} (1 - (z-p)^2) I(z)$$

$$= [1 - p^2] \sum_{z \in S^z} I(z) + 2p \sum_{z \in S^z} z I(z) - \sum_{z \in S^z} z^2 I(z),$$

where $S^z$ is the new kernel around pixel $z-p$. The sums $\Sigma I(z)$, $\Sigma z I(z)$, $\Sigma z^2 I(z)$ can be determined directly from the corresponding integral images. Because these sums require only a fixed number of operations at the corner pixels of the rectangular regions in the integral images, the total processing time is independent of the region size. The complexity is again constant O(1) time. This is also valid for bilinear interpolating filters.

Other linear spatial filters can be determined in constant time by a fast Fourier transform (FFT). Per pixel computation complexity of the underlying FFT depends only on the size of the image. For each input image, starting with a predetermined convolution kernel size, the FFT-based convolution is more advantageous than straightforward implementation. A Gaussian filter on a square kernel is separable, i.e., 2D filters can be decomposed into a set of 1 D filters.

When the filter radius r is relatively small, e.g., less than 50 pixels, the fastest way to determine the filter response is by a direct 1D convolution. The filter symmetry can be exploited to reduce the number of multiplications by a factor of two. Mien the filter radius is relatively large, direct convolution becomes time consuming, and FFT-based convolution is the best choice.

To guarantee a constant time processing, the separable 1D linear spatial filters are subsampled with a fifteen asymmetrical taps, i.e., there are more taps towards center, which is sufficiently accurate.

Integral Histograms

An integral image can used to determine local histograms over variable rectangular image regions, F. Porikli, "Integral histogram: A fast way to extract histograms in Cartesian spaces," Conference on Computer Vision and Pattern Recognition (CVPR), 2005; and U.S. patent application Ser. No. 11/052,598, "Method for Extracting and Searching Integral Histograms of Data Samples," filed by Porikli on Feb. 7, 2005, both incorporated herein by reference.

Figure 2:
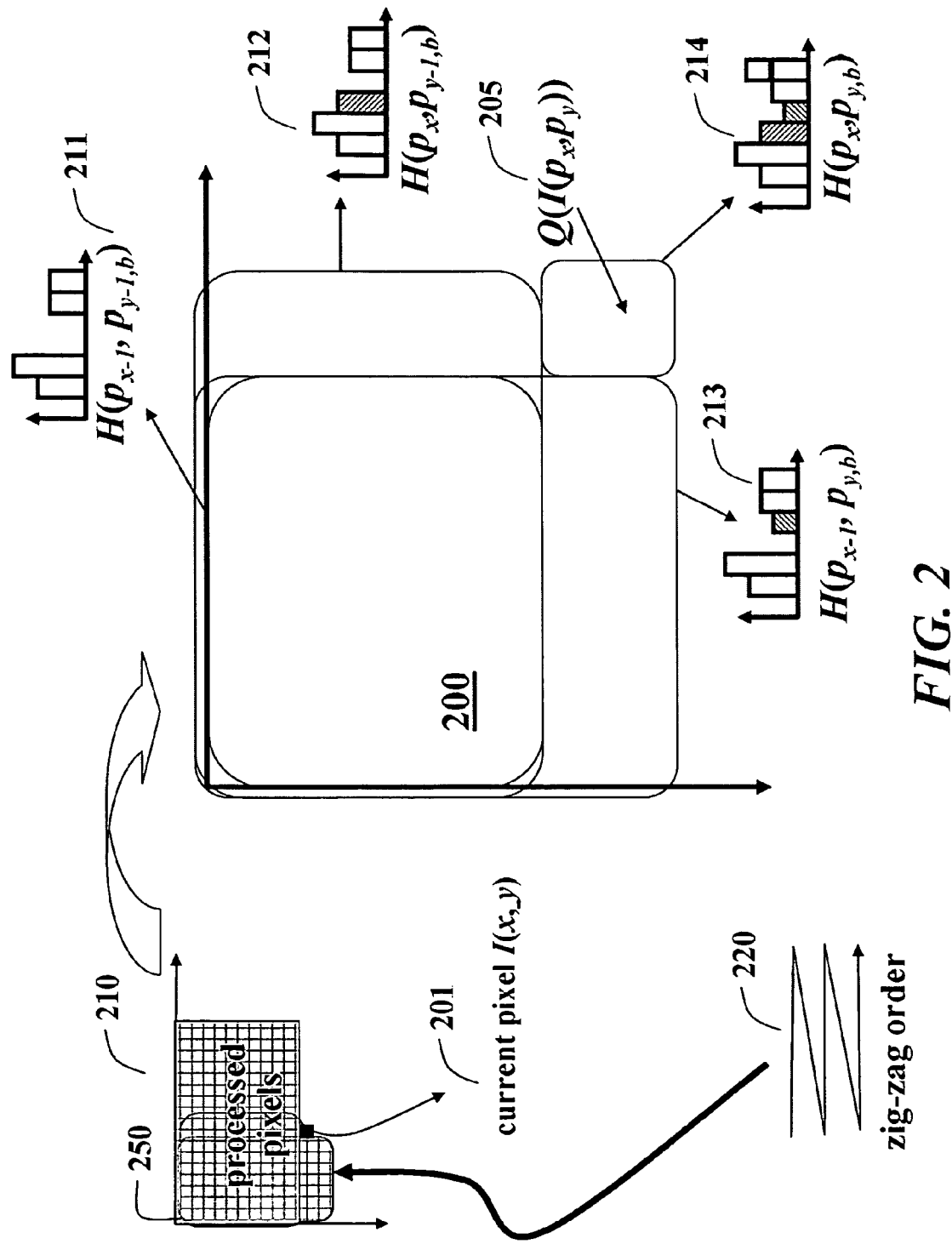
FIG. 2 is a schematic of constructing integral histograms according to an embodiment of the invention.

As shown in FIGS. 2-3, the integral histogram involves a propagation of pixel-wise histograms on a sequence of image pixels followed by an intersection of histograms determine the local histogram of any (rectangular) regions.

Integral histogram $H(p^m, b)$, where $b = 1 \ldots B$ at a current image pixel 201 at the $m^{th}$ position along a sequence of pixels $p^0, p^1, \ldots, p^m$ is defined as $$H(p^m, b) = \bigcup_{j=0}^{m} Q(I(p^j)),\qquad(14)$$

where Q(.) 205 is the corresponding bin for the current pixel 201. Each bin stores a coefficient indicating a number of pixels in a specified range of intensities, and an index to the coefficient. The union operator in Equation (14) is defined as follows. The coefficient value of the bin b of H($p^m$, b) is equal to the sum of the coefficients values of the histogram bins previously processed pixels 210 in the zig-zag order 220, i.e., the sum of all Q(I($p^j$)), while j<m. In other words, H($p^m$, b) is the histogram of the region between the origin 250 and the current pixel 201

$$0 \leq p_x^j \leq p_x^m, 0 \leq p_y^j \leq p_y^m.$$

The integral histogram H($p^N$, b) is equal to the histogram of all pixels because $p^N = [N_1, N_2]$ is the last (bottom left) pixel in the input image. Therefore, the integral histogram can be expressed recursively as $$H(p_x, p_y; b) = H(p_x-1, p_y; b) + H(p_x, p_y-1, b) - H(p_x-1, p_y-1, b) + Q(I(p_x; p_y)),\qquad(15)$$

using the initial condition H(0, 0, b)=0, which means all the bins are empty for the origin (top left) pixel 250.

The zig-zag scan 220 requires updating the integral histogram for pixels that were scanned for their left, upper, and upper-left neighbors. The integral histogram 214 at the current pixel is obtained by three arithmetic operations for each bin and using the integral histogram values of the three neighbors 212-213 as shown in FIG. 2. The integral histogram values of the previous pixel are copied to the current pixel before the propagation.

The histogram of a region T can be determined using the propagated integral histogram values at the boundary pixels $$(p_x^+, p_y^+), (p_x^-, p_y^+), (p_x^+, p_y^-), (p_x^-, p_y^-)$$

of the region as $$h(T,b) = H(p_x^+, p_y^+, b) - H(p_x^-, p_y^+, b) - H(p_x^+, p_y^-, b) + H(p_x^-, p_y^-, b).\qquad(16)$$

In contrast to the conventional histogram computation, the integral histogram method does not repeat the histogram extraction for each possible region, thus histogram extraction is not depend on the size r of the filter kernel. Hence, the processing time is constant for any filter size.

Note that, the integral histogram does not constrain a size of the spatial filter radius r when the bilateral filter is applied to each image pixel. In other words, it is possible to change the filter radius r adaptively at each pixel while scanning 220 the input image.

Distributed Histograms

Weiss operates on multiple columns at once because overlapping kernels are used. Given a multi-column operating framework, Weiss stores positive values for the pixels not in histogram for column i, and negative values for the pixels in the histogram for column i histogram that should not appear in histogram for column i+1. That results in histograms adjacent to the base that only keep track of one positive column and one negative column, and the histograms r distance away keeping track of r positive columns and r negative columns. The processing time for the above is O(log r) because the outer-most histograms do not benefit by sharing very few columns with the base, and there is overhead in maintaining a group of partial histograms, especially when r is large, e.g., greater than 128.

When the Weiss method is extended to include multiple tiers of base histograms, it corresponds to a large shared base histogram on the first tier, a few medium sized partial histograms spaced seven pixels apart on the second tier, and many small partial histograms at single pixel increments on the third tier. In a completely theoretical analysis of filtering of large radii, keeping hundreds of thousands of partial histograms on seven tiers, the Weiss processing time converges to O(log r). Weiss maintains large dictionaries in the center column of the scan to determine if the given neighbor pixels is outside r columns from the center pixel. However, maintaining these dictionaries is a lot slower than the histograms. Much more time is spent calculating the bilateral filter given the neighborhood as well as managing the dictionaries.

FIG. 3 shows the method for Type-I bilateral filters. The method filters an input image 301 with a bilateral filter to produce an output image 309. The input image includes pixels, and each pixel has an intensity. If the input image is in color (RGB), there are three intensities, one for each color. The bilateral filter 200 includes a spatial filter 330 and a range filter 342. An integral histogram 330 is constructed from the input image.

The integral histogram is processed 320 one pixel at the time, e.g., in the order 220. For each pixel, the spatial filter is applied to the integral histogram to produce a local histogram 303. Each local histogram has a bin for a specified range of intensities of the pixels. For example, if the intensities are eight bit values (0-255) and there are thirty-two bins, then each range spans eight level of intensities. Each bin is associated with a coefficient 321 indicating a number of pixels in the specified range, and in index 322 to the coefficient.

For each bin in each local histogram, the intensity 302 of the pixel is subtracted 340 from each index to produce a difference value 304. For each bin, the range filter is applied 350 to each difference value to produce a bin response 305. Each response is scaled 360 by the corresponding coefficient to produce a scaled response 361.

For each local histogram, the scaled responses are summed to produce a local response 371 for the local histogram, and the coefficients are summed 380 to produce a sum of the coefficient 381. Then, for each pixel, the local response is divided by the sum of the coefficients to produce a response 306 for the bilateral filter, which forms the output image.

FIG. 4 shows the method for Type-II bilateral filters. Power images 420 are constructed 410 from an input image 401 using polynomial range filter parameters 411. An arbitrary kernel spatial filter functions 421 is applied to the power images to produce filter responses 430. The filter responses and the power images are combined to produce an output image 403. The Type-II bilateral filter responses can be determined according to either Equations (8) or (9).

FIG. 5 shows the method for Type-III bilateral filters. Power images 420 are constructed 410 from the input image 401 using Gaussian range filter parameters 511. The arbitrary kernel spatial filter functions 421 is applied to the power images to produce filter responses 430. The filter responses and the power images are combined to produce the output image 403. The Type-III bilateral filter responses can be determined according to either Equations (12) or (13).

EFFECT OF THE INVENTION

The embodiments of the invention provide methods that enable constant time bilateral filtering independent of the radius of the filter.

Provided is an integral histogram based bilateral filtering method for bilateral filters with an arbitrary range box spatial filter.

The method takes advantage of overlapping kernels to avoid redundant operations. It is accurate (PSNR>45 dB), and extremely fast. It also enables setting spatial filter size adaptively at each pixel.

A formulation for type-II exact bilateral filters has a polynomial range filter and arbitrary spatial filters by linear filters. These filters give identical responses as their exact versions. As above, these filters are also very fast. Processing time is under 0.3 sec. for a 1 MB image independent of the filter radius.

Type-III bilateral filters, that have Gaussian range filter and arbitrary spatial filters, (down to $\sigma_r=0.1$) can be expressed by Taylor series, which transform non-linear bilateral filtering into linear filtering of image powers and adaptive setting of linear filter taps. This expansion is almost identical to the exact filter (PSNR>50 dB).

Considering the general trend toward higher-resolution images, which will correspondingly require larger kernel radii, filtering with large kernels as fast as the small ones makes the described methods advantageous.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for filtering an input image with a bilateral filter to produce an output image, wherein the bilateral filter includes a spatial filter and a range filter, comprising the steps of:

constructing an integral histogram from an input image including pixels, and wherein each pixel has an intensity;

applying, for each pixel, the spatial filter to the integral histogram to produce a local histogram, each local histogram having a bin for a specified range of intensities of the pixels, each bin associated with a coefficient indicating a number of pixels in the specified range and an index to the coefficient;

subtracting, for each bin in each local histogram, an intensity of the pixel from each index of the bin to produce a difference value;

applying, for each bin, the range filter to each difference value to produce a response;

scaling, each response by the corresponding coefficient to produce a scaled response;

summing, for each local histogram, the scaled responses to produce a local response for the local histogram;

summing, for each local histogram, the coefficients to produce a sum of the coefficient; and dividing, for each pixel, the local response by the sum of the coefficients to produce a response for the bilateral filter, which forms an output image.

2. The method of claim 1, in which a processing time for the filtering is constant for a given image size and independent of a radius of the bilateral filter.

3. The method of claim 1, in which temporally to produce an output sequence of images.

4. The method of claim 1, in which the spatial filter is f(k)=c, where c is an arbitrary constant, and the range filter is g(p, k), where p is a center pixel of the bilateral filter and k is a response.

5. The method of claim 1, in which the range filter is a Gaussian filter.

6. The method of claim 1, in which the range filter is a polynomial filter.

* * * * *